United States Patent [19]

Strickland

[11] 4,411,125
[45] Oct. 25, 1983

[54] MULTI-FUNCTION APPARATUS FOR LAWN MAINTENANCE

[76] Inventor: Hubert E. Strickland, 1108 Wright Ave., Chesapeake, Va. 23324

[21] Appl. No.: 378,725

[22] Filed: May 17, 1982

[51] Int. Cl.³ ..................... A01D 53/00; A01D 53/08
[52] U.S. Cl. ..................................... 56/16.9; 56/13.4; 56/320.1; 56/320.2
[58] Field of Search ................... 56/320.2, 320.1, 16.9, 56/13.4, 13.3, 13.2, 503, DIG. 18

[56] References Cited

U.S. PATENT DOCUMENTS

| | | | |
|---|---|---|---|
| 2,154,564 | 4/1939 | Eisenlohr | 56/16.9 |
| 2,762,184 | 9/1956 | Farrer | 56/13.4 |
| 2,843,991 | 7/1958 | Poehls | 56/13.3 |
| 2,920,435 | 1/1960 | Vallone | 56/13.3 |
| 2,963,842 | 12/1960 | Estes | 56/320.1 |
| 2,975,579 | 3/1961 | Balkus et al. | 56/295 |
| 3,103,077 | 9/1963 | Bennett | 56/16.9 |
| 3,247,656 | 4/1966 | Phelps | 56/295 |
| 3,604,187 | 9/1971 | Weber | 56/DIG. 18 |
| 3,688,479 | 9/1972 | Martinson et al. | 56/13.2 |
| 3,706,189 | 12/1972 | Rutherford | 56/13.4 |
| 3,708,968 | 1/1973 | Enters et al. | 56/16.5 |
| 3,759,029 | 9/1973 | Comer | 56/320.1 |
| 3,764,156 | 10/1973 | Nepper et al. | 56/DIG. 18 |
| 3,790,094 | 2/1974 | Spicer | 56/16.9 |
| 3,802,171 | 4/1974 | Cousino | 56/13.4 |
| 3,877,207 | 4/1975 | Lemelson | 56/16.9 |
| 3,974,629 | 8/1976 | Russell et al. | 56/320.2 |
| 4,087,955 | 5/1978 | Szymanis | 56/13.4 |
| 4,263,771 | 4/1981 | Iaboni et al. | 56/16.9 |

FOREIGN PATENT DOCUMENTS

| | | | |
|---|---|---|---|
| 2621292 | 11/1977 | Fed. Rep. of Germany | 56/60 |
| 2352484 | 12/1977 | France | 56/13.4 |

Primary Examiner—Paul J. Hirsch
Attorney, Agent, or Firm—Norman B. Rainer

[57] ABSTRACT

An apparatus for lawn maintenance incorporates the usual features of a lawn mower plus means which achieve the mulching and collection of lawn debris. The apparatus is provided with a wheel-equipped housing having an apertured upper deck upon which an engine is centered. Conduits extend from the apertures to a collector box positioned above the engine. The cutting blade has upturned extremities positioned to pass beneath the apertures. During rotary motion of the blade, air and debris are propelled upward through the apertures and conduits into the collector box. The debris is mulched by counter-rotating intermeshed blades positioned within the collector box, and blown into a porous collector bag carried by a handle attached to said housing.

3 Claims, 6 Drawing Figures

MULTI-FUNCTION APPARATUS FOR LAWN MAINTENANCE

BACKGROUND OF THE INVENTION

This invention concerns an apparatus for lawn maintenance, and more particularly to an engine-powered multi-functional wheeled apparatus for the traversal and treatment of lawns of grass.

Lawns comprised substantially of grass are of importance in the landscaping of buildings. The lawns present an attractive appearance, prevent soil erosion and prevent formation of mud deposits which can be carried into buildings by pedestrian traffic.

As one aspect of the continual maintenance of such lawns, mowing is required to cut the grass at a uniform height. Equipment for the mowing of lawns is well known and in widespread use. The cuttings severed from the grass, if left on the lawn, are unsightly and often adverse to the survival and growth of the grass.

Apparatus for the removal of grass cuttings and other lawn debris such as leaves and other matter of vegetative origin are well known and in widespread use. Such debris-removing apparatus are of several general types, namely: sweepers which physically lift the debris and deposit it into a receptacle mounted on a wheeled chassis, vacuum devices which cause a current of air to entrain the debris and convey it into a receptacle, and blower devices which cause the debris to be displaced to locations for accumulation and subsequent removal.

In the handling of said debris of vegetative origin, the high bulk volume causes difficulties in handling, necessitating large collection receptacles and/or frequent emptying of said receptacles at an ultimate disposal site. Devices for shredding or mulching such debris so as to reduce its bulk volume are well known but are generally designed to operate in a reasonably fixed location adjacent the site of disposal or transportive removal of said debris.

It is accordingly an object of the present invention to provide an engine-powered wheeled apparatus which can traverse a lawn of grass to cut said grass at a uniform height and remove the cuttings so formed.

It is a further object of this invention to provide an apparatus of the aforesaid nature which removes from said lawn by air entrainment grass cuttings and other debris of vegetative origin.

It is another object of the invention to provide an apparatus of the aforesaid nature which mulches said removed debris.

It is a still further object of the present invention to provide an apparatus of the aforesaid nature which collects the mulched debris.

These objects and other objects and advantages of the invention will be apparent from the following description.

SUMMARY OF THE INVENTION

The above and other beneficial objects and advantages are accomplished in accordance with the present invention by an improved lawn maintenance apparatus which comprises a wheel-equipped housing, an engine mounted atop said housing, a cutting blade rotatively disposed below said engine and within said housing, ducting means for upwardly conveying lawn debris, means driven by said engine for mulching said debris, a porous container adapted to collect said mulched debris, and handle means for directing said apparatus.

The housing is a shell-like structure, open at the bottom and comprised of a substantially horizontally disposed deck portion and peripherally disposed sidewalls. The housing is preferably fabricated as an integral monolithic structure from rigid, durable material such as metal or plastics. Four wheels are associated with said sidewalls to provide rolling support of the apparatus, said wheels preferably being mounted in a manner permitting adjustment of the height of said housing from the ground upon which the wheels rest. A resilient skirt is deployed about the lowermost extremity of the sidewall to prevent debris from being thrown from beneath the housing and to modify the flow of air into said housing. The deck is provided with means for mounting an engine, a central aperture to permit passage of a vertical drive shaft from said engine, and four peripheral apertures for passage of debris in a manner to be described hereinafter.

The engine is preferably gasoline operated and of conventional design. The cutting blade, adapted for rotation in a horizontal plane about a drive shaft extending vertically below said engine, preferably has four cutting extremities arranged in a cross design, each extremity preferably having an angled portion which will cause an upward flow of air. The cutting extemities are disposed to pass under the aforementioned peripheral apertures.

Associated in airtight engagement with each of the four peripheral apertures is a vertically oriented conduit. The upper extremities of the conduits support a collector box and communiate with the interior of said box.

Mulching means, preferably in the form of an intermeshed multitude of cutting discs driven by said engine, are positioned within said collector box, and act upon debris propelled thereinto by said cutting blade. The mulched debris driven by said flow of air and the action of said mulching means is captured by a container, preferably comprising fabric construction and removeably associated with the apparatus.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
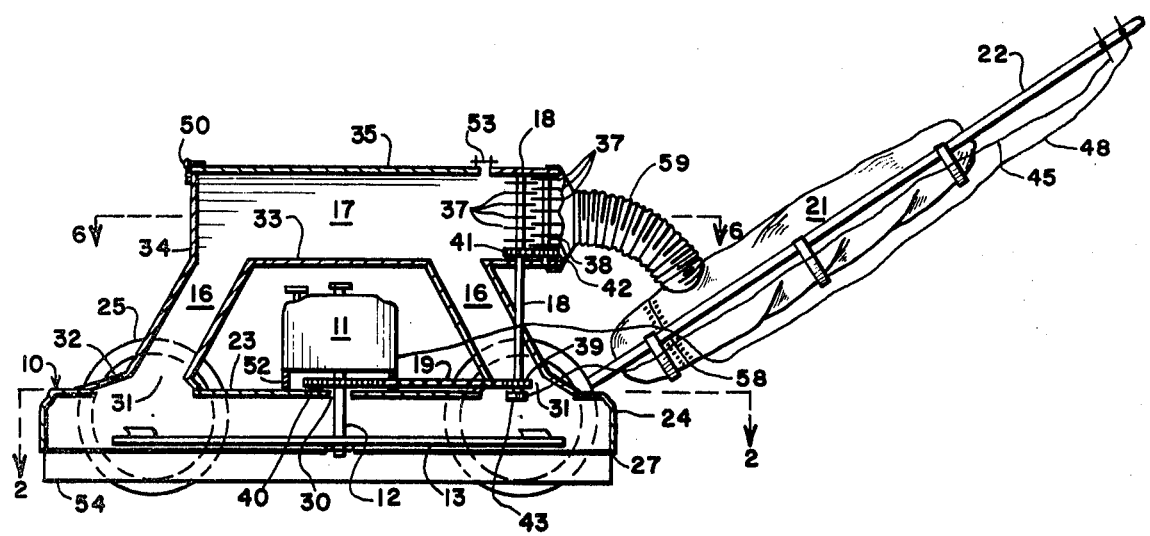
FIG. 1 is a side view of an embodiment of the apparatus of this invention with parts broken away to reveal interior detail.
Figure 2:
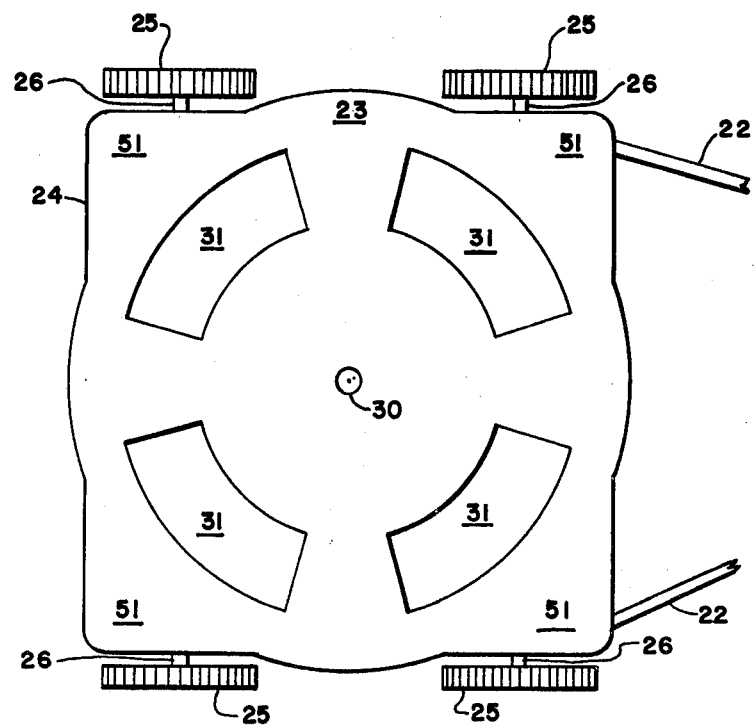
FIG. 2 is a partial sectional top view taken along the line 2—2 of FIG. 1.

Referring to FIGS. 1 and 2, an embodiment of the apparatus of this invention is shown comprised of housing 10 having deck portion 23, and sidewall portion 24. Said deck portion is provided with a central aperture 30 and four peripheral arcuate apertures 31 spaced 90° apart in a circular locus centered about aperture 30. Four wheels 25 are rotatively journaled by axles 26 to corner shoulder portions 51 integral with housing 10.

Figure 3:
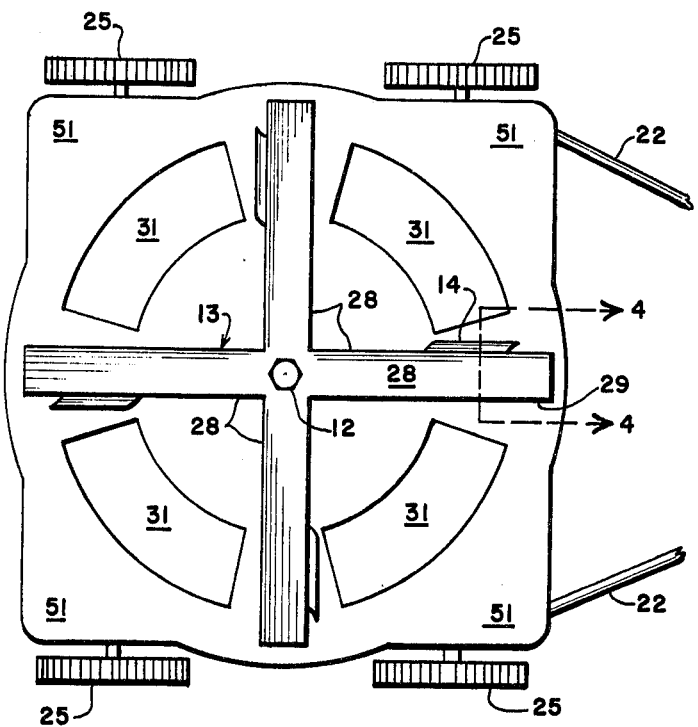
FIG. 3 is a bottom view of the apparatus of FIG. 1.
Figure 4:
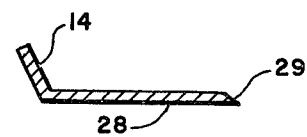
FIG. 4 is an enlarged sectional view of an extremity of the cutting blade taken along line 4—4 of FIG. 3.

A gasoline operated engine 11 mounted upon pedestal posts 52 is centrally positioned atop deck portion 23, said engine being provided with drive shaft 12, downwardly directed through aperture 30. The engine is of standard design, equipped with fuel tank, carburetor, and control means. A cutting blade 13 is affixed to the lower extremity of drive shaft 12 and adapted to rotate in a horizontal plane above the lowermost edge 27 of sidewall portion 24. The cutting blade, shown more clearly in FIGS. 3 and 4, is comprised of four identical arms 28 symmetrically disposed 90° apart about drive shaft 12. Each arm, adjacent the extremity thereof, is provided with a cutting edge 29 and an opposed upwardly slanted trailing edge 14, said cutting edge and slanted trailing edge being positioned to pass below arcuate apertures 31.

An elongated handle 22 is pivotably attached at its lower extremity to sidewall portion 24 at opposed sites at the rear extremity of housing 10.

Tubular conduits 16 of elliptical or circular cross section are attached at their lowermost extremities to deck portion 23 in a manner to form airtight couplings with arcuate apertures 31. To facilitate said airtight couplings, shaped footings 32 are utilized to bridge the contour differences between said apertures and the cross-sectional configuration of said conduits. The conduits are directed upwardly with respect to deck portion 23.

The uppermost extremities of conduits 16 support and communicate with collector chamber 17 comprised of bottom panel 33, front panel 34, top panel 35, removable rear panel 57 and identical side panels 36. The forward portion of top panel 35 is adapted to swing upwardly about hinge means 50 associated with the upper extremity of front panel 34. Said forward portion of panel 35 constitutes a door which permits access to the interior of chamber 17, said door being maintained in airtight closure with the upper extremities of the upright panels of said chamber by latch means 53.

Figure 6:
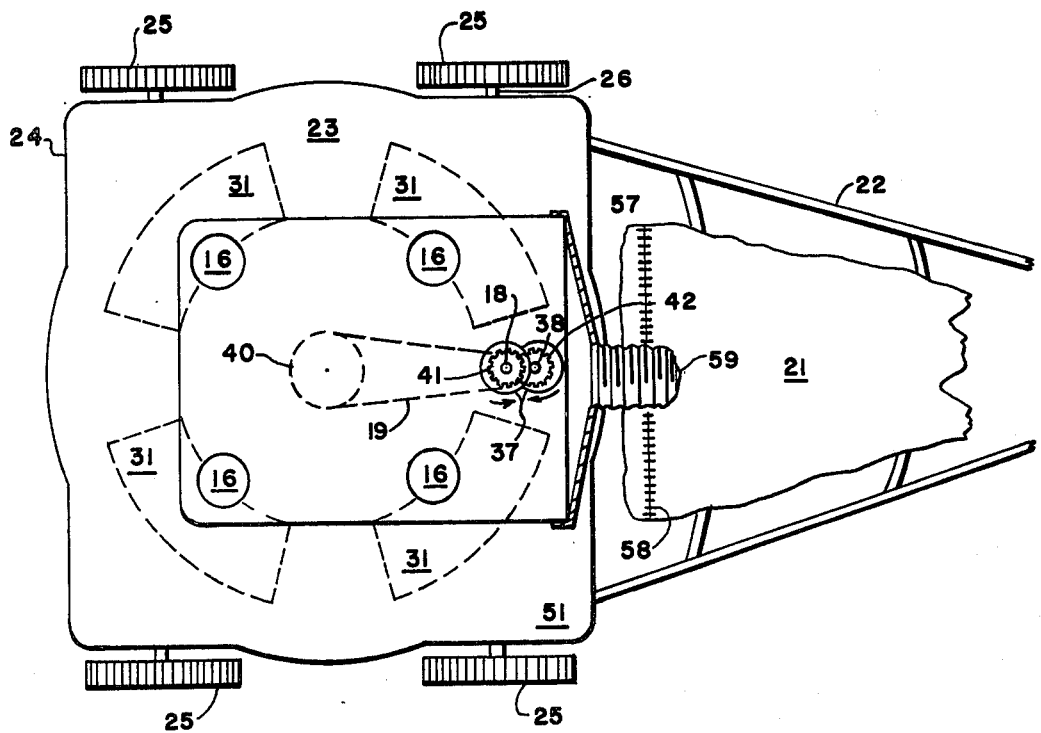
FIG. 6 is a top sectional view taken along the line 6—6 of FIG. 1.

Two rods 18 and 38 containing a multitude of mulching blades 37 are rotatively journaled to upper panel 35 and lower panel 33 adjacent the rear extremity of collector chamber 17, as shown more clearly in FIGS. 1 and 6. The rods are vertically oriented, and positioned so that blades 37 intermesh. The lower extremity of rod 18 penetrates panel 33 and extends to journaled engagement with deck 23. Gear 39, in splined engagement with rod 18, engages drive chain 19 which engages drive gear 40 affixed to drive shaft 12 above deck 23. A clutch mechanism 43 of conventional design is adapted to coupled and decouple gear 39 with respect to rod 18, said decoupling being achieved merely by causing gear 39 to be raised upon rod 18, whereupon it leaves its splined engagement with said rod. By such manner of arrangement, the engine may cause controlled rotative movement of rod 18. Synchronous counter-rotative movement of rod 38 is achieved by the action of gear wheel 41 attached to rod 18 acting in intermeshed relationship with gear wheel 42 attached to rod 38. The directions of rotation of rods 18 and 38 are indicated by the arrows in FIG. 6.

A cloth bag 21 removably communicates with collector chamber 17 by way of flexible conduit 59 removably attached to said bag and rear panel 57. Said bag, which may be provided with zipper means 58 or the equivalent to facilitate opening and closing, is supported by handle 22.

Standard throttle adjustment cable means 48, clutch control cable 45, and other control means may be provided on said handle. Said control means thereby adjust the speed of the engine, and may activate or deactivate the mulching mechanism. Suitable coupling drive means may also be provided to enable the engine to propel the apparatus by rotative action applied to wheels 25 or axles 26.

Figure 5:
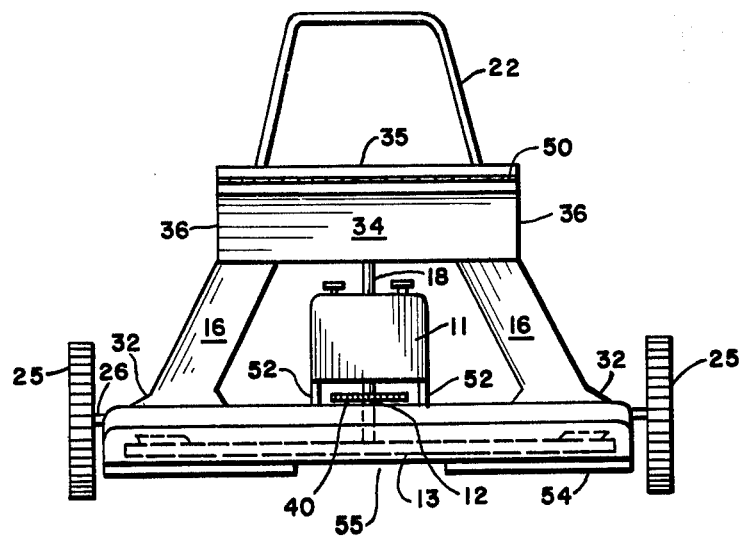
FIG. 5 is a front view of the apparatus of FIG. 1.

A resilient skirt 54 is pendantly attached to sidewall portion 24, and extends below lowermost edge 27 about the entire perimeter of the housing except for a front opening 55, as shown in FIG. 5. The purpose of the skirt is to prevent debris from being thrown from the housing, and to enhance air flow into the forward portion of the housing.

The design and construction of the apparatus is such that the upward air flow caused by the slanted trailing edges of the cutting blade causes debris to be blown through arcuate apertures 31 and thence through conduits 16 into collector chamber 17. The rotative motion of the mulching blades further advances the debris toward the rear of the collection chamber and into bag 21. The overall action of the apparatus therefore is to cut grass to a uniform height, and transform the cuttings and any other lawn debris to a compact easily disposable form in bag 21.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A lawn maintenance apparatus comprising:
   (a) a housing open at the bottom and comprised of a substantially horizontally disposed deck and peripherally disposed sidewall, and provided with four wheels for rolling support, said deck containing a central aperture and four arcuate apertures spaced 90° apart in a circular locus about said central aperture,
   (b) an engine mounted atop said deck and equipped with a drive shaft which is downwardly directed from said engine and penetrates said central aperture,
   (c) a cutting blade mounted upon said drive shaft, disposed below said engine within said housing and adapted for rotation in a horizontal plane, said cutting blade having four extremities arranged in a cross design, each extremity having an upwardly angled portion positioned to pass below said arcuate apertures,
   (d) ducting means communicating with said arcuate apertures for upwardly conveying lawn debris,
   (e) a collector box positioned above said engine and in communication with said ducting means,
   (f) means driven by said engine for mulching said debris, said means comprising a series of counter-rotating intermeshing circular discs mounted upon two rods positioned within said collector box,
   (g) a removable porous container adapted to collect said mulched debris, and (h) handle means pivotably associated with said housing.

2. The apparatus of claim 1 wherein a resilient skirt is pendantly deployed about the lowermost extremity of said sidewall.

3. The apparatus of claim 1 wherein the first of said rods is rotated by power transmission means associated with said drive shaft, and the second rod is rotated by geared engagement with said first rod.

* * * * *